(12) United States Patent
Naraoka

(10) Patent No.: US 7,266,058 B2
(45) Date of Patent: Sep. 4, 2007

(54) OBJECTIVE LENS DRIVE HAVING OPTICAL AXIS ADJUSTMENT FUNCTION

(75) Inventor: Koji Naraoka, Sayama (JP)

(73) Assignee: TEAC Corporation, Tokyo (JP)

( * ) Notice: Subject to any disclaimer, the term of this patent is extended or adjusted under 35 U.S.C. 154(b) by 570 days.

(21) Appl. No.: 10/692,042

(22) Filed: Oct. 22, 2003

(65) Prior Publication Data
US 2004/0081039 A1    Apr. 29, 2004

(30) Foreign Application Priority Data
Oct. 24, 2002    (JP) .............................. 2002-309255

(51) Int. Cl.
G11B 7/00    (2006.01)

(52) U.S. Cl. .................. 369/44.32; 369/53.19

(58) Field of Classification Search ................ 369/137, 369/144
See application file for complete search history.

(56) References Cited

U.S. PATENT DOCUMENTS

| | | | | |
|---|---|---|---|---|
| 5,083,302 A | * | 1/1992 | Tsuyuguchi et al. | 369/44.11 |
| 5,182,739 A | * | 1/1993 | Kime et al. | 369/44.15 |
| 5,305,294 A | * | 4/1994 | Kime et al. | 369/13.17 |
| 5,513,121 A | * | 4/1996 | Sugawara et al. | 369/44.14 |
| 5,740,150 A | * | 4/1998 | Uchimaru et al. | 369/119 |
| 6,154,326 A | * | 11/2000 | Ueyanagi et al. | 359/819 |
| 6,525,332 B1 | * | 2/2003 | Chang et al. | 250/559.37 |
| 6,791,772 B2 | * | 9/2004 | Wakabayashi et al. | 359/824 |
| 6,947,091 B1 | * | 9/2005 | Widmann et al. | 348/345 |
| 7,002,886 B2 | * | 2/2006 | Chu et al. | 369/53.19 |
| 2004/0057353 A1 | * | 3/2004 | Ohno et al. | 369/44.32 |

FOREIGN PATENT DOCUMENTS

| | | |
|---|---|---|
| JP | 9-35297 | 2/1997 |
| JP | 9050637 | 2/1997 |
| JP | 10261233 | 9/1998 |
| JP | 2000222754 | 8/2000 |
| JP | 2001/344788 | 12/2001 |

OTHER PUBLICATIONS

JP 09-050637 Translation Japan, Sugawara Yutaka, Publication Feb. 1997.*
JP 2001-344788 Translation Japan, Hiroi Masaki, Publication Dec. 2001.*

* cited by examiner

*Primary Examiner*—Wayne Young
*Assistant Examiner*—Van T. Pham
(74) *Attorney, Agent, or Firm*—Christensen O'Connor Johnson Kindness PLLC

(57) ABSTRACT

An objective lens drive having an optical axis adjustment function. An objective lens is supported by a lens holder, and the lens holder is supported on a suspension holder by way of a suspension. The suspension holder is supported so as to be rotatable about an axis extending in a direction in which the suspension extends, whereby the suspension holder is supported laterally by means of multilayer piezoelectric elements. When a drive voltage is applied to the multilayer piezoelectric elements, the piezoelectric elements are displaced vertically, whereupon the suspension holder is rotated about the axis, to thus adjust the optical axis of the objective lens.

3 Claims, 4 Drawing Sheets

OBJECTIVE LENS DRIVE HAVING OPTICAL AXIS ADJUSTMENT FUNCTION

BACKGROUND OF THE INVENTION

1. Field of the Invention

The invention relates to an objective lens drive, and more particularly, to a mechanism for adjusting the tilt of an optical axis of an objective lens.

2. Description of the Related Art

An apparatus for adjusting the inclination (tilt) of an optical axis of an objective lens with respect to a disk in an optical pickup has already been known.

In an optical pickup, one end of a suspension is fixed to a portion of a base, and a lens holder is fixed to the other end of the suspension, thus supporting the lens holder in a cantilever fashion. A magnet or a coil is provided on the lens holder, and the objective lens is driven in focusing and tracking directions by means of electromagnetic interaction developing between the lens holder and a magnetic circuit disposed on the base side of the optical pickup. In order to adjust the optical axis of the objective lens, there has already been known a configuration in which there is provided a piezoelectric element whose one end is fastened to a lower section of the base and whose other end is fixed to a portion for supporting the suspension and in which the piezoelectric element is actuated so as to act as an arm, thereby inclining the lens holder. Please refer to the following publication for further information.

Japanese Patent Laid-Open Publication No. Hei 9-50637.

However, the related-art technique has a configuration in which a piezoelectric element is provided in a lower section of the base as an arm or drive means, to thereby adjust the tilt of the optical axis of the objective lens. Provision of the piezoelectric element raises a problem of an increase in the thickness of the optical pickup. Particularly, in recent years, a demand exists for a more slim objective lens drive as represented by a CD drive, a DVD drive, or a combination drive doubling as a CD drive and a DVD drive, which is to be incorporated into a notebook personal computer. A mechanism involving an increase in thickness is not preferable.

SUMMARY OF THE INVENTION

The invention provides an apparatus capable of adjusting an inclination (tilt) of an optical axis of an objective lens while suppressing an increase in the thickness of the apparatus.

The present invention provides an objective lens drive for adjusting the tilt of an optical axis of an objective lens to be used for radiating light onto a recording medium, the drive comprising: a lens holder for holding the objective lens; a suspension which is at one end thereof fixed to the lens holder and which supports the lens holder in a cantilever fashion; a suspension holder for supporting the other end of the suspension; and a plurality of multilayer piezoelectric elements which support both ends of the suspension holder and rotate the suspension holder about an axis extending in a direction in which the suspension extends. The suspension holder is supported by multilayer piezoelectric elements. The multilayer piezoelectric elements are actuated so as to cause displacement in opposite directions. Torque is applied to the suspension holder about the axis extending in a direction in which the suspension holder extends, thereby rotating the suspension holder. Rotation of the suspension holder induces rotation of the lens holder, whereupon the objective lens is rotated. The tilt of the optical axis of the objective lens is adjusted by means of rotation of the objective lens.

In an embodiment of the invention, the suspension is provided so as to extend at right angles to the focusing and tracking directions, and the multilayer piezoelectric element is provided so as to extend in the tracking direction. By means of displacement of the multilayer piezoelectric elements in the focusing direction, the suspension holder is rotated about the axis extending in the direction in which the suspension extends; that is, a radial direction. The suspension holder is axially supported by a guide pin in the direction in which the suspension extends. According to another embodiment of the invention, a lower section of the suspension holder is supported by a hinge mechanism.

An example multilayer piezoelectric element is a bimorph piezoelectric element.

The objective lens drive of the invention can also be applied to an optical pickup of the optical disk drive such as a CD drive or a DVD drive.

DESCRIPTION OF THE PREFERRED EMBODIMENTS

Embodiments of the invention will be described hereinbelow by reference to the drawings. A case where an optical axis of an optical pickup is adjusted in a radial direction will now be described by means of taking, as an example, an optical pickup to be incorporated into an optical disk drive such as a CD drive or a DVD drive.

Figure 1:
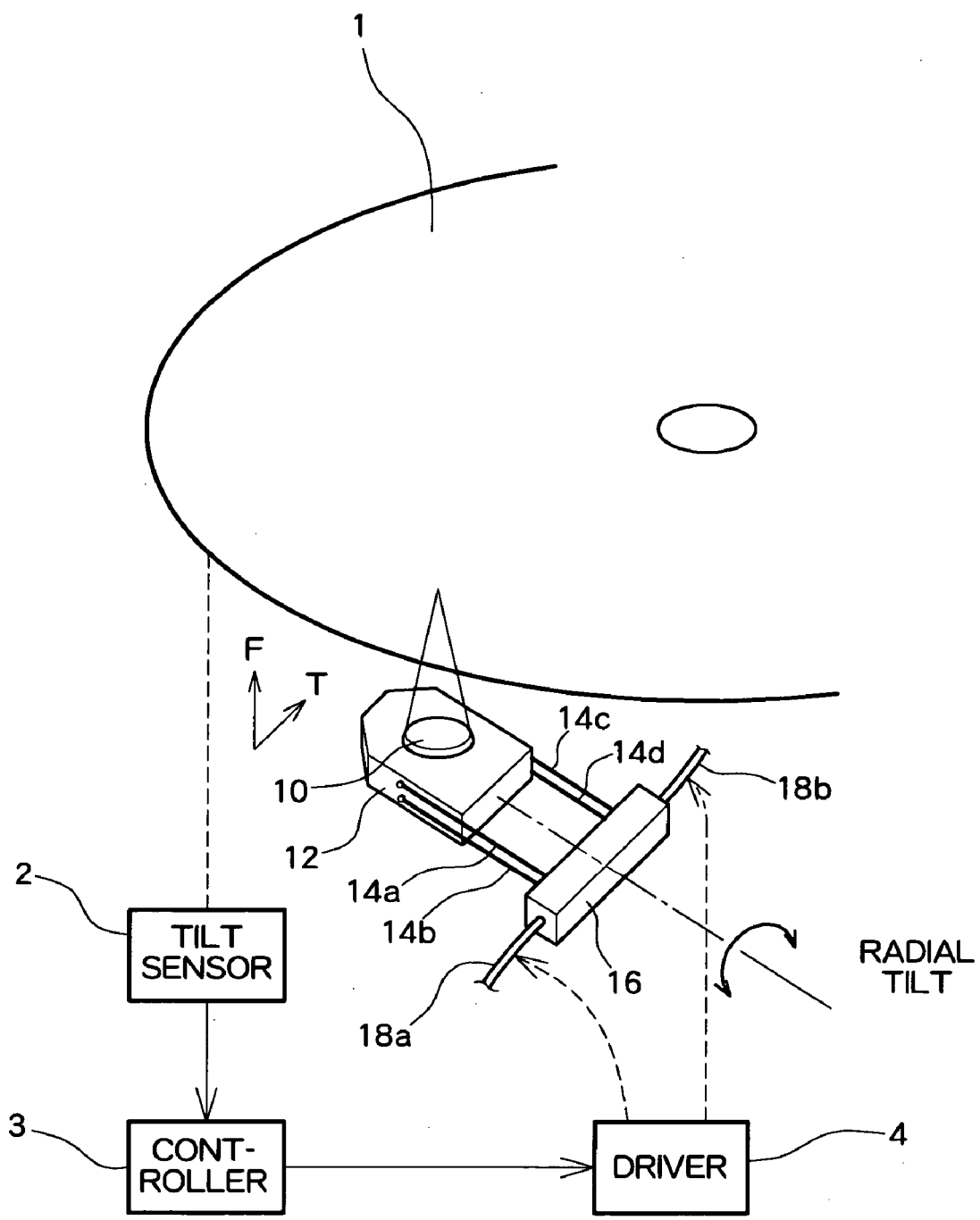
FIG. 1 is an overall block diagram of an objective lens drive according to an embodiment of the invention.

FIG. 1 shows the overall configuration of the optical pickup of the embodiment. An optical disk 1 is rotatably driven by a spindle motor. An objective lens 10 is disposed so as to oppose the optical disk 1. The objective lens 10 is supported by a lens holder 12, and the lens holder 12 is supported by four suspensions 14a, 14b, 14c, and 14d in a cantilever fashion. Specifically, one end of each of the suspensions 14a, 14b is fixed to a left-side surface of the lens holder 12, and the other end of each of the suspensions 14a, 14b is fixed to a suspension holder 16. One end of each of the suspensions 14c, 14d is fixed to a right-side surface of the lens holder 12, and the other end of each of the suspensions 14c, 14d is fixed to the suspension holder 16. As will be described later, the lens holder 12 is provided with a focusing coil and a tracking coil. By means of magnetic interaction developing between a magnet provided on the base and the lens holder 12, the lens holder 12 is actuated in the focusing and tracking directions. In the drawing, the focusing direction (i.e., a direction substantially perpendicular to the surface of the optical disk 1) is denoted by "F," and the tracking direction (i.e., the radial direction of the optical disk 1) is denoted by "T." The suspensions 14a to 14d spread within a plane substantially parallel to the surface of the optical disk 1 and in a direction perpendicular to both the focusing direction F and the tracking direction T. The tracking direction T is a transverse direction of tracks formed in the optical disk 1.

Although being supported on the base, the suspension holder 16 is not fixed to the base. Side surfaces of the suspension holder 16 are supported laterally by two multilayer piezoelectric elements 18a, 18b so as to suspend across the base and be rotatable about an axis running in the direction in which the suspensions 14a to 14d extend. The multilayer piezoelectric elements 18a, 18b extend in a direction substantially perpendicular to the direction in which the suspensions 14a to 14d extend. The multilayer piezoelectric elements 18a, 18b are at one end thereof fixed to the side surface of the suspension holder 16 and at other end thereof fixed to the base. The multilayer piezoelectric elements 18a, 18b are formed by stacking a plurality of piezoelectric elements in a vertical direction (i.e., a focusing direction). When driven by application of a voltage, the multilayer piezoelectric elements 18a, 18b become displaced in the vertical direction (focusing direction). The two multilayer piezoelectric elements 18a, 18b are actuated so as to become displaced in opposite directions (e.g., the multilayer piezoelectric element 18a is displaced in an upward direction, and the multilayer piezoelectric element 18b is displaced in a downward direction). As a result, axial torque develops in the suspension holder 16 about the direction in which the suspensions 14a to 14d extend. The suspension holder 16 is then rotated in a direction denoted by the arrow in the drawing; that is, a direction about the axis extending in the direction in which the suspensions 14a to 14d extend. As a result of rotation of the suspension holder 16, the lens holder 12 supported by the suspension holder 16 by way of the suspensions 14a to 14d is also rotated, whereupon the optical axis of the objective lens 10 also rotates. The suspensions 14a to 14d are provided at right angles to the focusing direction F and the tracking direction T. The optical axis of the objective lens 10 is rotated in a radial direction in such a manner as that shown in the drawing, as a result of the suspension holder 16 being rotated around the direction in which the suspensions 14a to 14d extend.

A tilt sensor 2 is provided for detecting an inclination (tilt) between the optical disk 1 and the optical axis of the objective lens 10, and a detection signal is fed to a controller 3. The tilt sensor 2 has a light-emitting device and a light-receiving device, which are provided in, e.g., a predetermined layout relationship. A laser beam is emitted from the light-emitting device, reflected by the optical disk 1, and then received by the light-receiving device. The amount and direction of tilt can be detected on the basis of a change in the amount of received light induced by inclination of the optical disk 1. As a matter of course, the amount and direction of tilt may also be detected by means of detecting the quantity of a recording or playback laser beam which has been emitted from the objective lens 10 and reflected by the optical disk 1. In accordance with the detection signal output from the tilt sensor 2, the controller 3 outputs a control instruction to a driver 4 so as to eliminate a tilt.

In accordance with the control instruction output from the controller 3, the driver 4 supplies a drive voltage to the multilayer piezoelectric elements 18a, 18b which laterally support the suspension holder 16. As mentioned previously, when a drive voltage is applied to the piezoelectric elements 18a, 18b, the elements 18a, 18b are displaced vertically. The suspension holder 16 is rotated by means of setting the multilayer structures of the piezoelectric elements 18a, 18b so that the elements become displaced in opposite directions, to thus change the optical axis of the objective lens 10 in a radial direction. As a result, the radial tilt of the optical axis is changed.

The configuration of the optical pickup of the embodiment will now be described in more detail.

Figure 2:
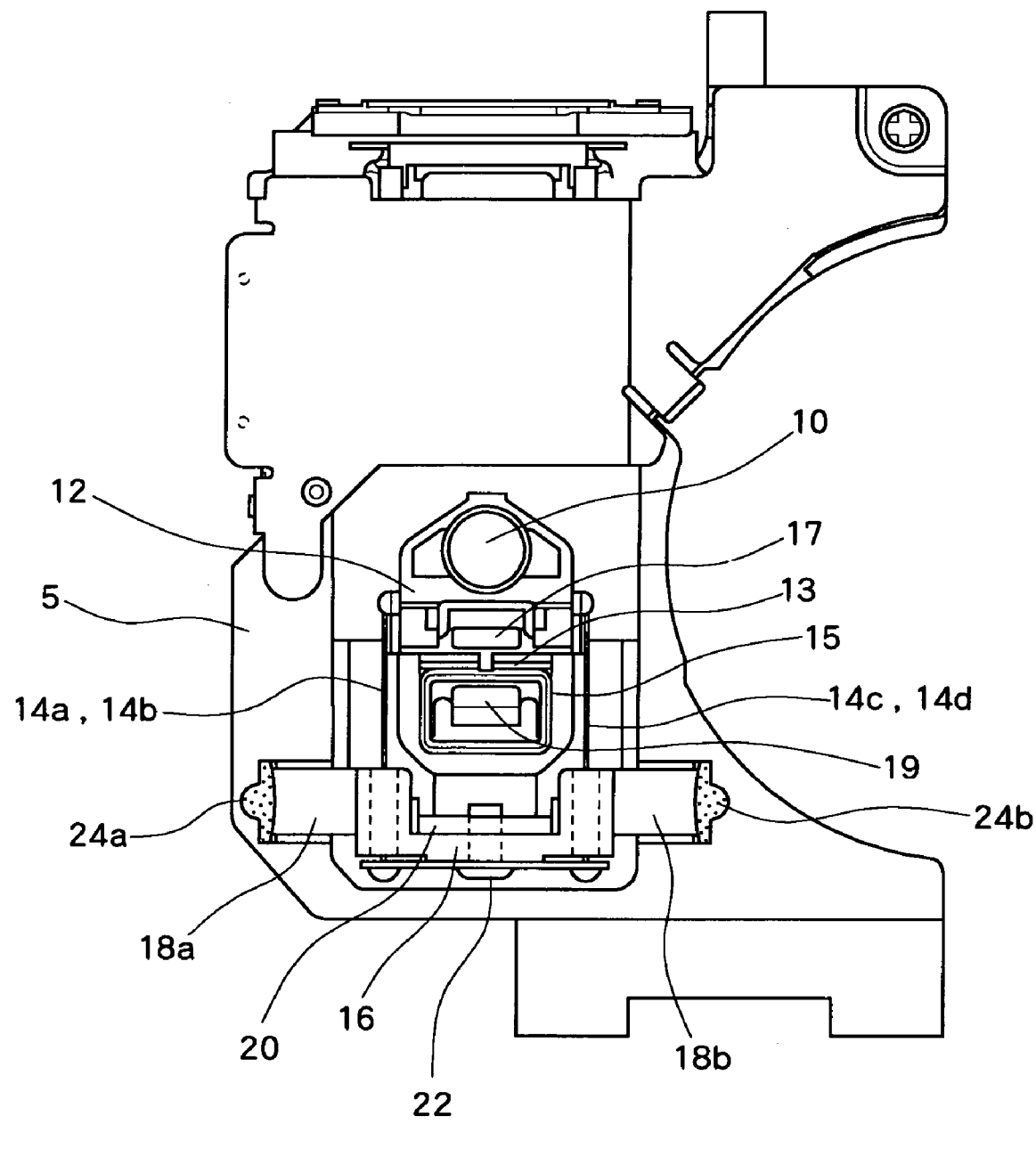
FIG. 2 is a plan view of the objective lens drive of the embodiment.

FIG. 2 shows a plan view of the optical pickup shown in FIG. 1. The entire objective lens drive is mounted on a carriage 5 and held so as to be movable in a radial direction of the optical disk 1. The objective lens drive is constituted of the objective lens 10, the lens holder 12 for supporting the objective lens 10, a magnetic circuit provided in the lens holder 12, the suspensions 14a to 14d elastically supporting the lens holder 12, the suspension holder 16 for supporting the suspensions 14a to 14d, the multilayer piezoelectric elements 18a, 18b for supporting the suspension holder 16, and the base.

The magnetic circuit of the lens holder 12 is constituted of a focusing coil 15 and a tracking coil 13. The tracking coil 13 is provided so as to oppose, in close proximity thereto, a magnet 17 provided on the yoke base 20, which is in an upright position. The focusing coil 15 is arranged so as to surround a magnet 19 provided on the yoke base 20, which is in an upright position. A focus servo signal output from a focus servo circuit provided in the optical disk drive is delivered to the focusing coil 15. The focusing coil 15 is actuated in the direction perpendicular to the drawing sheet relative to the magnet 19 by means of electromagnetic interaction developing between the focusing coil 15 and the magnet 19. At racking servo signal output from a tracking servo circuit provided in the optical disk drive is supplied to the tracking coil 13. The tracking coil 13 is actuated in a lateral direction (i.e., a direction T in the drawing) on the drawing sheet relative to the magnet 17 by means of electromagnetic interaction developing between the tracking coil 13 and the magnet 17. The lens holder 12 provided with the tracking coil 13 and the focusing coil 15 is elastically supported by four suspensions. Hence, the objective lens 10 is moved in both the focusing and tracking directions by means of actuation of the coils 13, 15.

The suspensions 14a to 14d are at one end thereof fixed to lateral sides of the lens holder 12 and at the other end thereof fixed to the suspension holder 16 assuming a bent shape. A bent portion of the suspension holder 16 is axially supported, with a guide pin 22, on the yoke base 20 provided in an upright position. The direction in which the guide pin 22 axially supports the suspension holder 16 is identical with the direction in which the suspensions 14a to 14d extend. The lens holder 12 is supported on the suspension holder 16 by way of the suspensions 14a to 14d. The suspension holder 16 is axially supported on the base by means of the guide pin 22. Hence, the entire lens holder 12 is also axially supported on the yoke base 20 by means of the guide pin 22.

The suspension holder 16 is axially supported on the yoke base 20 by means of the guide pin 22. The multilayer piezoelectric elements 18a, 18b are at one end thereof fixed to the lateral sides of the suspension holder 16. An example piezoelectric element used for the multilayer piezoelectric elements 18a, 18b is a bimorph piezoelectric element. The piezoelectric elements 18a, 18b are at the other end thereof fixed to the yoke base 20; more accurately, to the carriage 5, by means of adhesives 24a, 24b. The suspensions 14a, 14b are arranged vertically so as to support the left-side surface of the lens holder 12, and the suspensions 14c, 14d are arranged vertically so as to support the right-side surface of the lens holder 12. The multilayer piezoelectric elements 18a, 18b have a height which is substantially halfway between the height of the suspensions 14a, 14c and that of the suspensions 14b, 14d and laterally support the suspension holder 16. A pair of multilayer piezoelectric elements 18a, 18b are provided so as to extend in the tracking direction T.

Figure 3A:
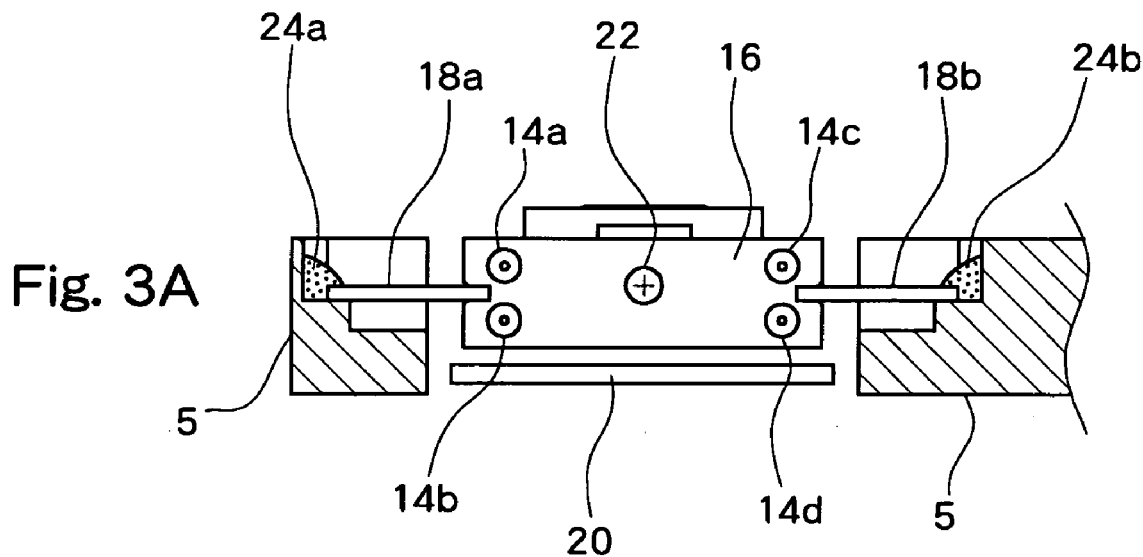
FIG. 3A is a side view of the optical pickup of the embodiment when remaining in an inoperative state.
Figure 3B:
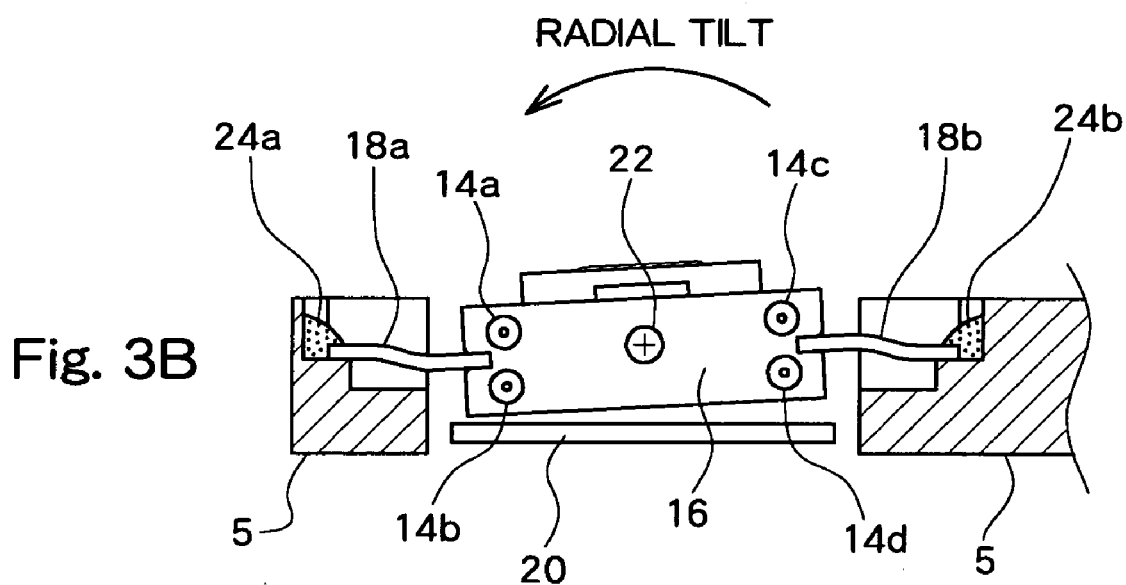
FIG. 3B is a side view of the optical pickup of the embodiment when remaining in an operating state.

FIGS. 3A and 3B show side views of an optical pickup. FIG. 3A is a side view of the multilayer piezoelectric element remaining in an inoperative state. The suspension holder 16 is supported rotatably by upwardly-standing sections of the yoke base 20, by means of the guide pin 22. The guide pin 22 penetrates through the suspension holder 16 in a direction connecting substantial centers on side surfaces of the suspension holder 16 to the gravity center of the suspension holder 16. Lateral ends of the suspension holder 16 are supported by the multilayer piezoelectric elements 18a, 18b. FIG. 3B is a side view showing the piezoelectric elements 18a, 18b which remain in an actuated state when being supplied with a drive voltage from the driver 4. When a bimorph piezoelectric element is used for the multilayer piezoelectric elements 18a, 18b, lead wires are connected to respective layers stacked in the vertical direction (focusing direction). A potential difference is caused to arise between the layers, to thereby displace the piezoelectric element vertically. The multilayer piezoelectric element 18a is displaced in a downward direction in the drawing by means of the drive voltage, and the multilayer piezoelectric element 18b is displaced in an upward direction in the drawing. By means of such displacement actions in opposite directions, the suspension holder 16 is rotated in the direction designated by the arrow (i.e., the direction of a radial tilt), to thus adjust the tilt of the optical axis of the objective lens 10. In order to displace the piezoelectric elements 18a, 18b in opposite directions, the only essential requirement is to reverse the sequence in which the layers of the piezoelectric elements 18a, 18b are stacked (for example, when a piezoelectric element is constituted of a layer A and a layer B, the piezoelectric element 18a is formed by stacking the layer B on the layer A, and the piezoelectric element 18b is formed by stacking the layer A on the layer B). The amount of displacement of the piezoelectric elements 18a, 18b is set to a level at which the amount of tilt detected by the tilt sensor 2 is canceled.

As mentioned above, according to the embodiment, the tilt adjustment mechanism is not provided in a lower portion of the base, which has hitherto been the case. The suspension holder 16 is laterally suspended by the multilayer piezoelectric elements 18a, 18b, whereby the suspension holder 16 is rotatably actuated laterally by the piezoelectric elements 18a, 18b. The tilt of the optical axis of the objective lens 10 can be adjusted without involvement of a increase in the overall thickness of the objective lens drive. In the embodiment, the focusing coil 15 and the tracking coil 13 are provided on the lens holder 12, and the multilayer piezoelectric elements 18a, 18b actuate the suspension holder 16. Hence, interference with the focusing or tracking drive means can be prevented. The optical axis can be adjusted while the focusing or tracking performance is maintained. Squeezing of a space for the focusing or tracking drive means does not arise, and sharing of components is unnecessary. An increase in the weight of the lens holder 12 can be avoided. Even in this respect, there is no chance of a drop arising in the focusing or tracking performance.

The embodiment of the invention has been described thus far. However, the invention is not limited to this embodiment and susceptible to various modifications.

For instance, according to the embodiment, the suspension holder 16 is supported by the guide pin 22 so as to be axially rotatable. However, the suspension holder 16 may be supported in a rotatable manner by another means.

Figure 4A:
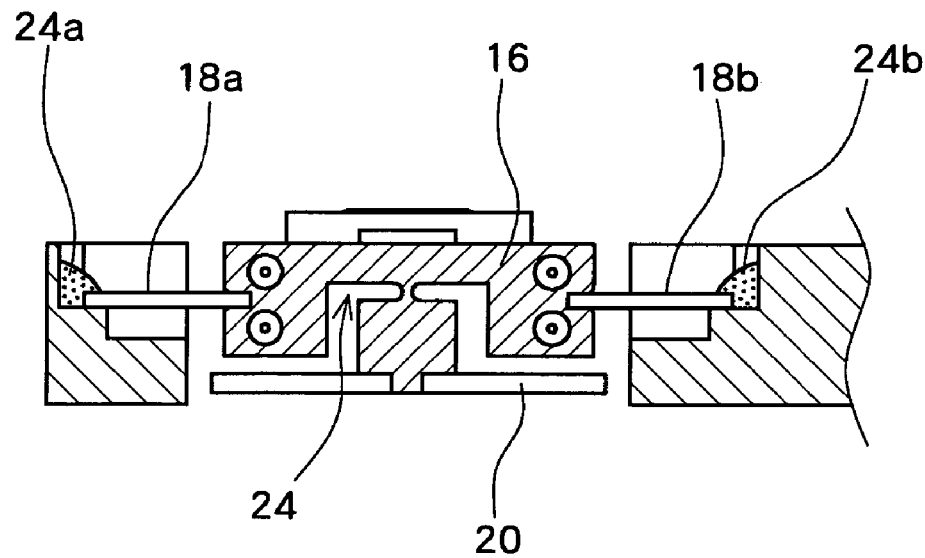
FIG. 4A is a side view of the objective lens drive according to another embodiment of the invention when remaining in an inoperative state.
Figure 4B:
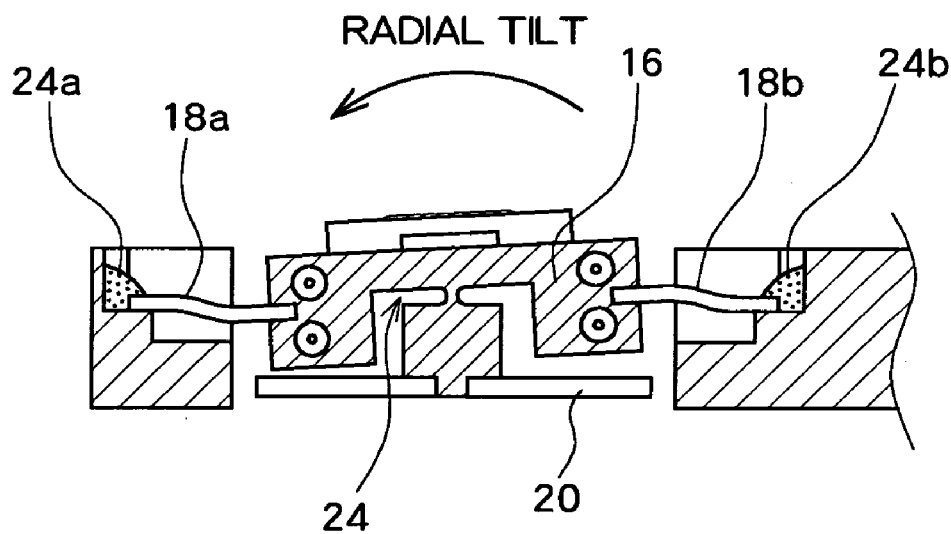
FIG. 4B is a side view of the objective lens drive of the other embodiment of the invention when remaining in an operating state.

FIGS. 4A and 4B show an example in which a lower section of the suspension holder 16 is supported rotatably by means of a hinge structure 24. FIG. 4A is a side view of the piezoelectric elements 18a, 18b remaining in an inoperative state, and FIG. 4B is a side view of the piezoelectric elements 18a, 18b remaining in an operating state. The lower section of the suspension holder 16 can be simply supported by a hinge structure. A recessed section is formed in the lower section of the suspension holder 16 in order to reduce the thicknesswise size of the suspension holder, and hinge sections are provided in an upright position on the base 20 so as to fit into the recessed section. An interior surface of the recessed section of the suspension holder 16 is connected to a hinge receiving section by means of a hinge structure 24. The suspension holder 16 is supported so as to be rotatable about the axis extending in the direction in which the suspensions 14a to 14d extend. As in the case of the previous embodiment, the multilayer piezoelectric elements 18a, 18b are fixed to the right and left sides of the suspension holder 16. By means of displacement of the piezoelectric elements 18a, 18b, torque is applied to the suspension holder 16. Specifically, in accordance with the amount and direction of tilt detected by the tilt sensor 2, the driver 4 actuates the piezoelectric elements 18a, 18b so that the elements are displaced in opposite directions. In the drawing, the piezoelectric element 18a is displaced downward, and the piezoelectric element 18b is displaced upward. This configuration also enables adjustment of the optical axis of the objective lens 10 without involvement of an increase in the thickness of the objective lens drive.

What is claimed is:

1. An objective lens drive for adjusting the tilt of an optical axis of an objective lens to be used for radiating light onto a recording medium, the drive comprising:
    a lens holder for holding the objective lens;
    a plurality of suspensions which are at one end thereof fixed to right and left sides of said lens holder, support said lens holder in a cantilever fashion, and are provided so as to extend in a direction perpendicular to focusing and tracking directions;
    a suspension holder for supporting the other end of the plurality of said suspensions;
    first and second piezoelectric elements which attach said suspension holder to a carriage, which are fixed at one end thereof to said carriage and which are provided so as to extend in the tracking direction, said first piezoelectric element attaching to a first side surface of said suspension holder and said second piezoelectric element attaching to a second side surface of said suspension holder opposite to said first side surface; and
    axial support means for axially supporting said suspension holder so that the suspension holder is rotatable in a radial direction of said recording medium, wherein torque is applied to said suspension holder by means of displacement of said first piezoelectric element in a first direction and displacement of said second piezoelectric element in a second direction opposite said first direction, so that said suspension holder is rotated in the radial direction of said recording medium.

2. The drive according to claim 1, wherein said axial support means is a guide pin which axially supports said suspension holder on said carriage along the direction in which said suspension extends.

3. The drive according to claim 1, wherein said axial support means is a hinge for supporting a lower section of said suspension holder along the direction in which said suspension extends.

* * * * *